Aug. 21, 1956 W. E. KATZ ET AL 2,760,152
INDICATOR FOR THE DEMINERALIZATION OF WATER
Filed Aug. 19, 1953 2 Sheets-Sheet 2

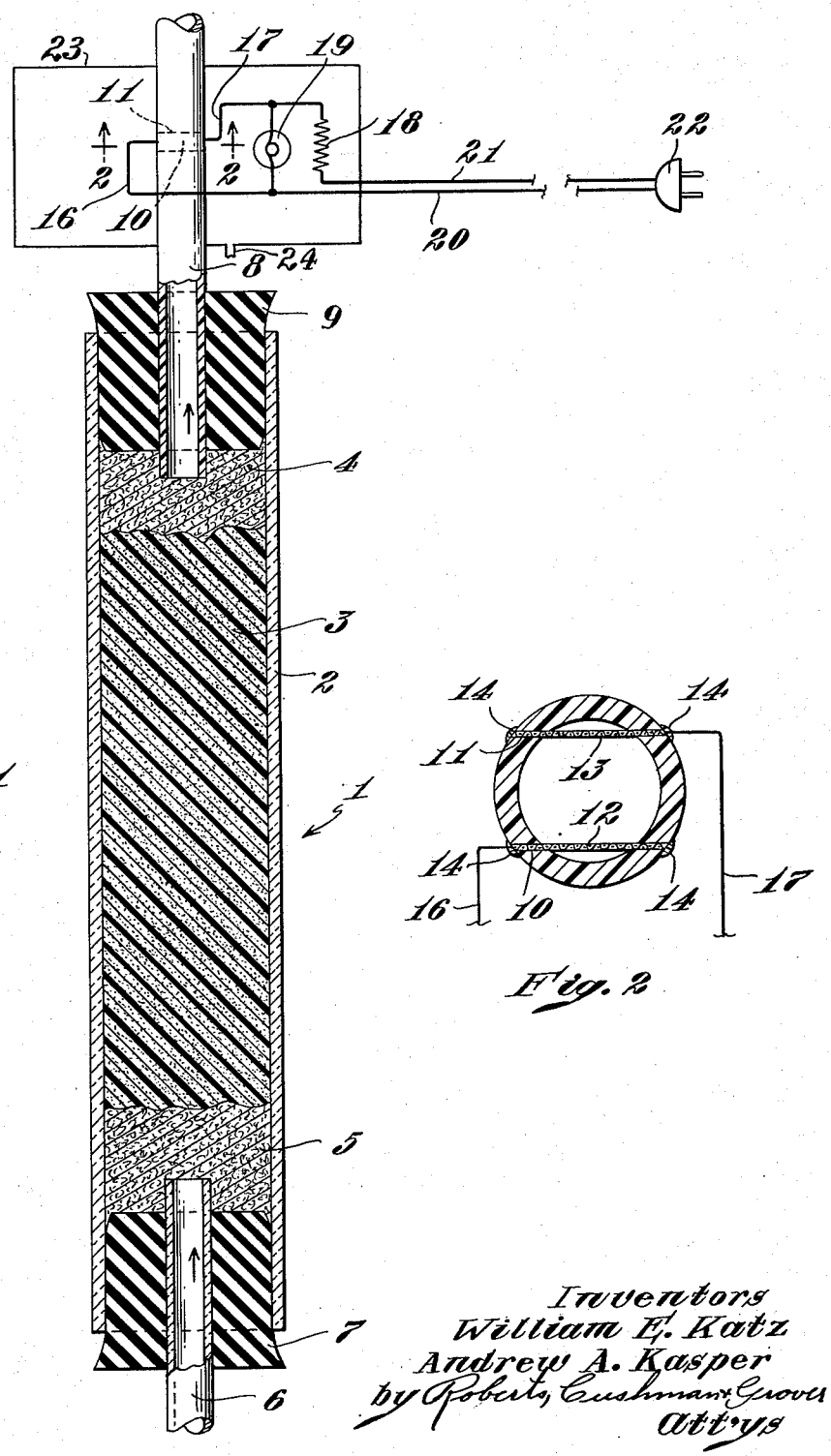

INVENTORS
WILLIAM E. KATZ
ANDREW A. KASPER
BY
ATTORNEYS

United States Patent Office 2,760,152
Patented Aug. 21, 1956

2,760,152

INDICATOR FOR THE DEMINERALIZATION OF WATER

William E. Katz, Boston, and Andrew A. Kasper, Watertown, Mass., assignors to Ionics, Incorporated, Cambridge, Mass., a corporation of Massachusetts Application August 19, 1953, Serial No. 375,250

7 Claims. (Cl. 324—30)

This invention relates to the demineralization of water, and more particularly to means whereby the effectiveness of such demineralization may be determined readily and economically. This application is a continuation-in-part of my copending case Ser. No. 183,070, filed September 2, 1950, now abandoned.

The specific resistance or conductance of water which is usually measured by means of well known conductance bridge circuits, is a known reliable measure of its purity with respect to dissolved substances. In fact, the quality of purified water is commonly designated and measured in terms of its electrical resistance, that is the higher the resistance, the lower the concentration of ionic impurities.

In this specification and in the appended claims the term "demineralization system" refers to a system capable of reducing the concentration of dissolved solids, which lower the resistance and raise the conductivity, and more especially those which ionize in water.

An object of this invention is to provide an improved, simple, and economical purity-indicating device for ion exchange and other demineralization systems.

A further object of this invention is to provide simple, effective, and economical ion-exchange demineralization systems in which the effectiveness of ion-exhange demineralization may be readily determined and hence controlled and regulated.

A further object of this invention is to provide very simple and effective means to prevent failure of the indicator device due to leakage and lamp failure.

In the following specification water will be called "pure" or "impure" depending on its low or high concentration of dissolved substance or ions. "Pure" water may be regarded as having a specific electrical resistance in excess of a chosen value and "impure" water as having a resistivity below that chosen value. For example, said chosen value may be 51,800 ohms at 180° C. in systems designed to produce water containing less than 10 parts per million (as NaCl) of dissolved salts. In general, the value and suitability of the purity indicator of this invention is greatest for testing waters for common uses, namely water varying from substantially deionized water having an ionic content of less than 5 p. p. m. as sodium chloride to waters for common community, industrial and agriculture use varying from 50 p. p. m. to 1000 p. p. m. approximately, and even to waters containing substantially higher salt concentrations as may occur in the progressive demineralization of sea water or brine for example.

In its broadest aspect the electrical purity indicating device of this invention comprises a set of at least two electrodes, suitable for complete immersion into the water to be tested, an impedance or impedances, preferably a resistor or resistors, in series with the electrodes, one and preferably two openings through the indicator casing located between the lamp and the electrodes, a suitable source of current, preferably alternating current, applied across the series combination of electrodes and resistor or resistors, and an electrically operated low-power signal, which might be a visual or acoustic signal, connected in parallel with the electrodes (or in parallel with the impedance or resistance). The signal is connected across the set of electrodes and is energized or "on" when the resistance of the water is high, that is, when the voltage drop across the signal in parallel therewith is high. The signal goes off when the water becomes impure because, when the water resistance falls, it decreases the voltage drop across the signal in parallel therewith below the value required to energize the signal. This type of operation herein referred to as "on-safe" operation, is a particularly advantageous feature of the invention because it gives a continuous positive indication and assurance when the water is pure, and a negative indication when the water becomes impure or when any incidental errors such as power failure, or signal failure, or the like, occur.

The action of the circuit is based on the voltage divider principle wherein the applied voltage, which must be constant within some stated tolerance, is divided between the fixed resistor and the variable resistance of the water between the electrodes. When the water is very "pure" its resistance is very high and the electrodes take up a relatively large amount of the available voltage drop, and the current then energizes the signal. When the water is "impure" its resistance is lower, the current passes therethrough between the electrodes, relatively less of the available voltage drop is impressed across the cell and accordingly the signal goes "off."

In one embodiment, the invention consists specifically of a pair of electrodes immersed in water (for example, the electrodes might be of such dimensions and spacing that the resistance across them is 118,000 ohms when the specific resistance of the water is 51,800 ohms), a neon glow lamp (NE-51 of the General Electric Company) in parallel with said electrodes, an opening running through the indicator between the lamp and the electrodes and situated outside of the section to be inserted in the liquid to be demineralized, a fixed ½ watt carbon resistor of 200,000 ohms in series with the lamp-electrode combination, and a source of 110 volt, 50–60 cycle, alternating current applied across the series circuit. As a safety measure, the single 200,000 ohm series resistor may be replaced by two 100,000 ohm ½ watt resistors, one being placed on each side of the lamp-electrode combination, and preferably located next to the prongs of the electric plug of the device.

The useful life of the neon glow lamp in the purity indicating device varies inversely with the cube of the overload current passing through the lamp. The high resistance in series with the lamp assures long economical reliable operation of the indicating device and is a novel feature of this invention.

The elements are so proportioned that when the water has a specific resistance greater than some specified value, say 51,800 ohms, the voltage across the lamp is sufficient to keep it lit, but when the specific resistance of the water falls below 51,800 ohms, the voltage across the lamp becomes insufficient to keep it lit. This simple system is realized whenever it is attached to, or forms part of, any demineralizer or demineralizing system such as stills, including vapor compression stills and, preferably, ion-exchange systems.

In this specification and in the appended claims by "electrically operated low-power signal" is meant a suitable light, bell, or other electrically actuated device having a power consumption of less than 2 watts, including relay-operated signals in which the relay is actuated by a power of less than 2 watts, and preferably has a relatively sharp and constant activating and deactivating current or voltage.

An aspect of this invention provides a suitable ion-exchange demineralization system comprising successive active $H^+$-form cation and $OH^-$-form anion exchanger beds, or "mixed beds" in a cartridge (which may be of the disposable type) containing a mixture of said active H-form cation- and OH-form anion-exchange resins in suitable proportions. Such ion-exchange demineralization systems are provide with suitable water inlets and outlets and with the conductivity electrodes mounted in the outlet stream in such a way that a contact is continuously maintained between the electrodes by the stream of water coming from the cartridge. In this preferred system, the indicating device forms an integral part of the ion-exchange system giving not only a simple indication of the lack of purity (as upon exhaustion of the exchangers) but also of lack of purity when water is forced through the system at a rate exceeding the rate of adsorption of the ions from the water onto the resins. For example, in the normal operation of a mixed ion-exchange resin bed, it is evidently possible to demineralize water by means of this mixture at high flow rates while the bed is active because the path of the water through the active resin bed is then longer. That is, the time of contact of the water with the fully active resin is greater. Towards the end of the operation when the fraction of active resin bed is relatively small so that the path through and the time of contact of the water with active resin have become less (if the water is still passed at the initial flow rate), a slower flow through the bed is necessary for its full utilization. Evidently, to use the mixed bed or other ion-exchange system to greatest advantage, a continuously operating indicating device, of the "on-safe" type (which shows that break-through of ions occurs at an excessive flow rate and also shows that a resumed removal of ions occurs upon slowing said flow rate), is an inherent feature of such a system and renders said exchangers capable of maximum utilization. Accordingly, a system comprising economical ion-exchangers as well as the built-in indicator device of this invention possess the advantage of permitting the user to choose his flow rate through the ion-exchanger system or cartridge directly to obtain full capacity utilization.

The following examples illustrate how this invention may be carried out; they are not to be construed in a limiting sense.

In the drawings illustrating a specific embodiment of the invention:

Figure 1 is a diagrammatic view of an ion-exchange demineralization system of this invention showing in section a cartridge containing the ion-exchange resins;

Figure 2 is an enlarged sectional view taken on lines 2—2 of Figure 1 showing one of the conductivity electrodes.

Figure 3:
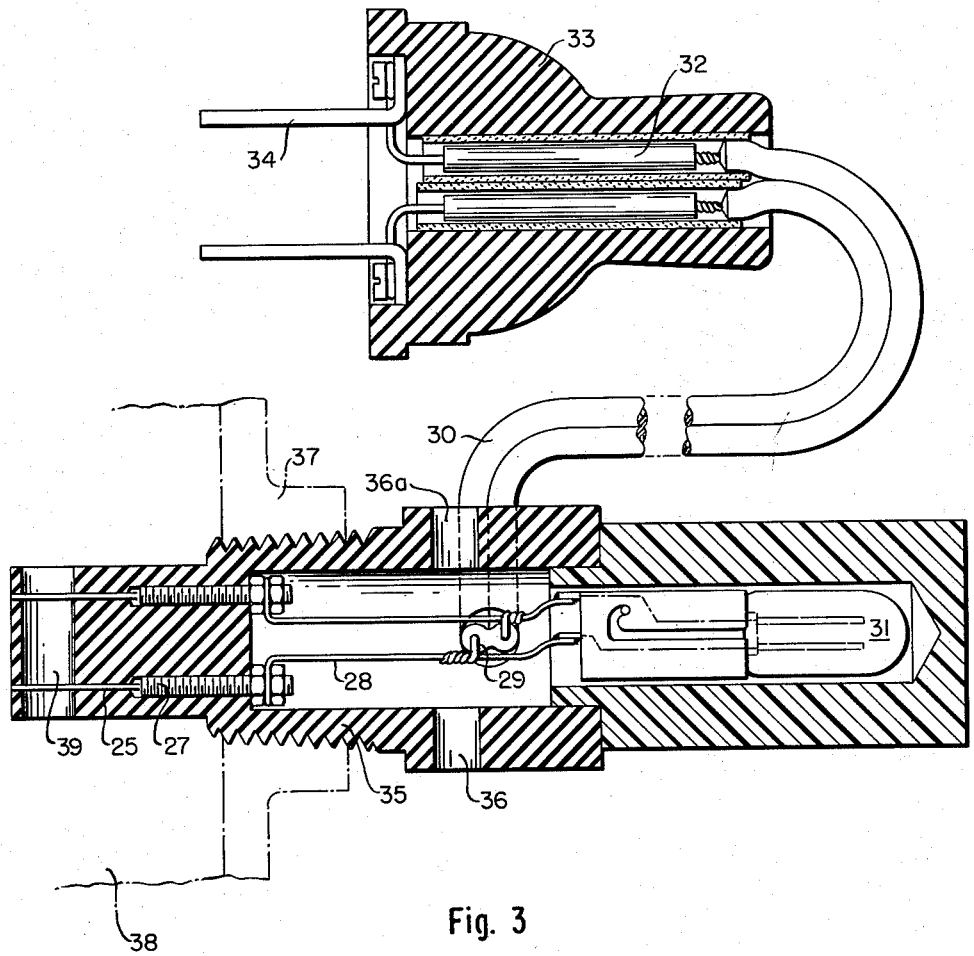
Figure 3 is a cross sectional view of the indicator unit in its preferred form.

In the drawings (Figs. 1 and 2) cartridge 1 is shown specifically as composed of a glass tube 2 containing a bed 3 of suitable mixed cation and anion exchange resin. Conveniently the bed 3 may be composed of a uniform mixture of equal parts by volume of Nalcite HCR cation-exchange resin in the hydrogen form, which is sulfonated polystyrene (W. C. Bauman, JACS 69, pages 28–30, 1947, and D'Alelio U. S. Patent 2,366,007), and an anion exchange resin in the hydroxyl form, such as Amberlite IR 4-B, which is a polyamine type anion exchange polymer. Above and below the bed 3 are plugs 4 and 5 of glass wool. Water inlet tube 6, which may be of glass, extends into the plug of glass wool 5 through rubber stopper 7, which seals the lower end of tube 2. Water outlet 8, which is illustrated as being of polystyrene, extends into the plug of glass wool 4 through rubber stopper 9, which seals the upper end of tube 2.

Polystyrene tube 8 which is electrically non-conductive, is slotted at 10 and 11 to receive the carefully spaced apart electrodes 12 and 13, respectively which may be short lengths of silver wire having a diameter of the order of 1 mm., or metal plates or wire screening of definite predetermined characteristics and dimensions. The slots 10 and 11 are exteriorly sealed by polystyrene adhesive 14.

This electrode assembly has no significant constructions or obstructions to the stream flow which is a novel feature of this invention.

Lead wires 16 and 17 are connected to the electrodes 12 and 13 respectively. Fixed resistance 18 which may be a one-half watt carbon resistor of 200,000 ohms, is shown as connected in series with the electrodes 12 and 13. Besides its function to act as part of the voltage divider, the resistor 18 has another important function in that it serves to limit the current passing through the glow-lamp bulb 19 to the value recommended by the manufacturer, regardless of how high the resistance between electrodes 12 and 13 may become. One of the novel features of this invention is the simple electrical design, containing few and inexpensive elements, which are still however combined in a manner to give low power consumption, good sensitivity in the range of purities for which designed, a positive indication of external circuit failure, and correct loading of the indicator signal, in this case, the bulb 19, under all conditions of the resistance of the water, ranging from very high resistances to a short circuit. A glow-lamp 19 of low power consumption, which may be of the neon type and suitably a GE neon glow lamp NE–51 (1/25 watt) or other lamp filled with an inert gas, is connected in parallel to the electrodes 12 and 13. Leads 20 and 21 extend to a male plug 22 which in turn may be connected to a suitable source of alternating current, conveniently of 110 volts and 50–60 cycles. Due to the water pressure of 40 or 50 pounds per sq. inch in line 8, it was found that in spite of all precautions some very minute leakage or seepage of moisture would often find its way past the electrodes through adhesive 14 into the casing 23 of the indicator device. This accumulated moisture would sometimes short the circuit causing failure of lamp 19 to operate as required. The provision of a small opening 24 (about 1/16" in diameter) through casing 23 located between lamp 19 and water tube 8 allows any moisture leakage to be removed thus preventing failure of glow lamp 19.

The completed assembly of this embodiment of the invention, including the electrode assembly, has overall dimensions of 1"x1"x3" this compactness being a novel feature of this invention.

The neon bulb 19 is preferably selected from commercial bulbs aged 100 hours before use, to have a predetermined desired ignition voltage, for example, 65 volts, whereby further calibration of the system is rendered unnecessary for many applications of a commercial nature.

In operation the plug is connected to a suitable source of alternating current and the water to be purified is admitted into the inlet tube 6 and is caused to flow upward through the resin 3, thence completely around and past the conductivity electrodes 12 and 13, and outward from the upper end of outlet tube 8. When the purified water passing by the electrodes 12 and 13 had a specific resistance of 51,800 to 54,000 ohms or greater, or in other words, when the purified water contained 10.0–9.5 p. p. m. or less of ionized solids calculated as NaCl, the voltage across the neon lamp 19 was sufficient to ignite the lamp and to keep it lit. When, however, the resistance of the water became less than 51,800 to 54,000 ohms, due to the exhaustion of the resin bed 3, or to excessive rate of flow of water through the cartridge tube 2 (or other cause), the voltage across the neon lamp was insufficient to keep it lit and it went out.

Fig. 3 shows the indicator assembly in its preferred form and includes water line 38 with exposed electrodes 25 in the opening 39, attached to the electrodes are screw conductors 27 which in turn are secured to leads 28. Leads 28 are connected to the line cord 30 of plug 33 by connections 29 to which in parallel the glow lamp 31 is also secured. The resistors or impedances are shown at 32 to be located in plug 33 and connected to plug prongs 34. The indicator device is embedded in a plastic threaded casing 35 which is connected to the water line 38 through the coupling 37. Openings 36 and 36ᵃ form a passageway or openings throuugh the plastic casing between water line 38 and glow lamp 31.

Example 1

For the purpose of demonstrating the accuracy of this example, the purity indicator described above was fitted with a variable resistor in parallel with the electrodes, and by means of this variable resistor the signal was first adjusted to go from "on" to "off" at a salt content, calculated as NaCl, of 5 p. p. m.. Distilled water flowing from a gas-fired still was tested on a conventional purity meter and found to contain 3 p. p. m. of total ionized solids. The purity indicator of this invention was then inserted into the stream of distilled water; the light was on, showing that the water was of higher purity than that for which the indicator was set.

Subsequently, the purity indicator was re-adjusted to change from "on" to "off" at 2 p. p. m. by means of the variable resistor. When it was again inserted into the stream of distilled water, the light was "off" indicating that the stream of distilled water containing 3 p. p. m. of dissolved ionized solids, was below the degree of purity for which the indicator had been adjusted or set.

The same purity indicator as thus adjusted was next connected into a stream of water emerging from a bed of mixed ion-exchange resins consisting of 50 cc. of Nalcite HCR (a sulfonated polystyrene) in the hydrogen form and 50 cc. of Nalcite SAR (a quaternary alkyl amine type polymer) in the hydroxyl form. The flow rate of the water was 90–95 cc./min. and the light was "on," showing that the water was purer than 2 p. p. m. A check on a conventional purity meter showed that the water contained less than 0.5 p. p. m. of total dissolved solids.

Example 2

The following example illustrates the use of this invention in order to ascertain permissible rates of flow of water through a demineralizer and further illustrates the sensitivity of the invention to changes in water quality and ion-exchange operating conditions.

It will be seen that when the system is operating satisfactorily to provide effluent water of the desired purity, the neon lamp will remain lit, but when the resistance of the water decreases owing to exhaustion of the resin bed 3, or to too rapid rate of flow through the deionization system, the greater conductivity or lower resistance of the more concentrated or ionized water will cause more current to be drawn from the constant voltage source thus raising the voltage drop across the fixed series resistor and leaving less voltage to operate the signal so that it will go out.

Cartridge 1 was filled with a mixture of 50 cc. of Dowex 50 (same as Nalcite HSR) in the H-form and 50 cc. of Amberlite IR–4B in the OH-form which was completely active or regenerated at the beginning of the experiment. Tap water containing 110 p. p. m. (calculated as NaCl) was run through the bed of mixed resins at various rates of flow to demonstrate the effective and critical operation of this invention:

| Flow rate, cc./min. | Condition of light | Independent purity measurement as p.p.m. NaCl |
|---|---|---|
| 77 | on bright | 5.9 |
| 142 | do | 5.9 |
| 195 | just off | 10.0 |
| 254 | off | 14.0 |
| 220 | do | 13.0 |
| 170 | just on | 10.0 |
| 180 | do | 9.5 |

This table illustrates clearly the effect of the flow rate through the exchanger to alter the concentration of dissolved ionized substances contained therein and the accurate recording and measuring of the same by means of the indicating device herein described.

It will be understood that various suitable commercial forms of ion-exchange resin may be employed in carrying out this invention and that the application of the invention is not limited to any particular ion-exchange resin.

The system of this example is not only highly effective but is so simple and inexpensive as to be highly adapted for use with disposable cartridges of ion-exchange resin and the indicating mechanism may be discarded with the cartridge if desired.

In the following examples the purity indicator was set to change from "on" to "off" at 10 p. p. m. or 51,800 ohms.

Example 3

A uniform mixture of 50 cc. of Nalcite SAR in the hydroxyl form and 50 cc. of Nalcite HCR in the hydrogen form was packed into a glass tube ⅞ inch in diameter to a height of 10 inches, and retained in a manner similar to that shown in Figure 1. A purity indicator of the type herein disclosed was attached to the glass tube. Synthetic tap water having total ionized solids of 1000 p. p. m. was run through the bed at a steady flow rate of 90–95 cc./min. Samples of effluent water were collected at regular intervals and their purity was otherwise checked. As long as the specific resistance of the effluent water was greater than 51,800 ohms, the light was "on" and the ionized solids concentration of the effluent was less than 10 p. p. m.; when the purity indicator bulb went out, conventional methods of analysis showed that the impurities exceeded 10 p. p. m.

Example 4

A two-bed demineralization system comprising a bed of 50 cc. Nalcite HCR in the hydrogen form and a separate bed of 50 cc. of Nalcite SAR in the hydroxyl form was arranged so that tap water having total ionized solids of 100–120 p. p. m. was passed first through the bed of Nalcite HCR, thence through the bed of Nalcite SAR, and finally through a purity meter of the type herein disclosed and described, as it came from the bed of Nalcite SAR, in the manner analogous to that shown in Figure 1. The flow rate of the tap water was 90–95 cc./min. The indicator light remained on, while periodic sampling and analyzing of the effluent showed concentrations of ionic solids from 2.0 p. p. m. gradually increasing throughout the run to 10.0 p. p. m., at which time the indicator light was extinguished. In place of the exchangers mentioned above we may use any other high-capacity cation exchangers of the sulfonated polystyrene or phenolsulfonic acid formaldehyde condensation product type, or the like, and as anion exchangers any weak base amine resin or strong quaternary alkyl amine resin.

Example 5

A two-bed "reverse" demineralization system comprising a bed of 50 cc. of Amberlite IRA—400 in the hydroxyl form and a separate bed of 50 cc. of Amberlite IRC–50 in the hydrogen form was arranged so that tap water containing 100–120 p. p. m. of total ionized solids passed at a steady flow rate of 95 cc./min. first through the bed of Amberlite IRA–400 (or Nalcite SAR), thence, through the bed of 50 cc. of Amberlite IRC–50, and finally through the cell of the purity indicator of the type herein disclosed affixed to the second bed in a manner similar to that shown in Figure 1. The indicator light remained "on" and periodic samples of the effluent, analyzed in a conventional manner, showed water purities of 2.0 p. p. m. gradually increasing throughout the run to 10.0 p. p. m. at which point the light went "off."

It will be derived from the foregoing that the criterion for the activation of the indicator device is that condition of the water between the electrodes, in respect of its dissolved, ionized or electrically conductive components, which presents an electrical resistance to the passage of current therethrough such that the voltage drop across the parallel combination of signal and electrodes is varied as the resistance varies and when the resistance of the water becomes less than the desired resistance, the voltage across it and across the signal is not sufficient to maintain the signal and the signal goes out. The relationship between the specific resistance of the water and the circuit resistance of the electrodes can be varied at will to meet different design requirements by varying the space between the electrodes, which is occupied by the water under test, the exact size, and the ratio of the opposed surface areas of the electrodes which are totally immersed in and wetted thereby. These factors may be positively varied or standardized in any given instance, as desired, with accurate indication of the conductivity and hence of the purity of the water, or stream of water, in which the electrodes are immersed.

We have found that the effectiveness and reliability of an economical embodiment of this purity indicating device may be greatly improved by aging and grading the electrically operated low power signal. That is, we have found that variations in operating characteristics of the low power signal occur with greatest frequency in the first 100 hours of operation. We therefore age the signals for 100 hours, then test their operating characteristics, selecting those which are suitable for the embodiment of the purity indicating device. The subsequent variations in operating characteristics of the signals are then so small as to be well within the design tolerances of the indicating device eliminating the necessity of incorporating a calibrating circuit to give satisfactory operation.

Thus, 85 neon glow lamps were aged 100 hours in a 115 v. A. C. circuit which included a 200,000 ohm resistor in series with said glow lamp.

Sixteen of these lamps failed to extinguish in the purity indicating device of Example 2 when the specific resistance of water was 46,600 ohm$^{-1}$ cm.$^{-1}$ (that is, 11 p. p. m. as sodium chloride) and were rejected. Nine of the remaining lamps were then chosen at random and operated satisfactorily for over 3,000 hours without failure or necessity of calibration.

It should be understood that the present disclosure is for the purpose of illustration only and that this invention includes all modifications and equivalents which fall within the scope of the appended claims.

We claim:

1. A device for monitoring the electrolyte concentration of aqueous solutions comprising a pair of exposed electrodes for immersion in said solution, at least one end of each electrode being embedded in a casing, said electrodes being connected in said casing in parallel to an electronic glow lamp and power leads, the glow lamp being characterized by a predetermined energizing voltage directly across said electrodes, means situated in said casing between the glow lamp and the electrodes for continuously removing moisture caused by leakage in the casing, impedance sufficiently large to limit the current through said glow lamp in series with said electrodes and glow lamp, said electrodes being of surface area and spacing adapted to provide an impedance between them when immersed in said solution to cause the voltage across said electrodes and glow lamp to equal the energizing voltage of said glow lamp when the specific conductivity of said solution is at a predetermined value corresponding to the desired electrolyte concentration of said solution.

2. The device defined by claim 1 wherein the moisture removing means is sufficient to allow evaporation of any leakage in said device.

3. The device defined by claim 1 wherein the moisture removing means is sufficient to allow drippage of any leakage in said device.

4. The device defined by claim 1 wherein the glow lamp consists of a partially aged neon glow lamp having a relatively constant energizing voltage.

5. The device defined by claim 1 wherein the impedance in series with said electrodes and glow lamp consists of an impedance in series with each of said electrodes, said impedances being approximately equal.

6. The device of claim 5 wherein said impedances are located in a plug in series with the power leads extended therefrom.

7. A device for monitoring the electrolyte concentration of aqueous solutions comprising a pair of exposed electrodes for immersion in said solution, at least one end of each electrode being embedded in a casing and having connections to a gas-filled glow lamp having a power consumption of less than 2 watts and power leads in parallel therewith to a source of alternating current of 110 volts and 50–60 cycles, the glow lamp being characterized by a predetermined energizing voltage directly across said electrodes, two resistors in series with said electrodes and glow lamp, one located on each side of the glow lamp and preferably located in a plug in series with the power leads extending therefrom, said electrodes being of surface area and spacing adapted to provide an impedance between them when immersed in said solution to cause the voltage across said electrodes and glow lamp to equal the energizing voltage of said glow lamp when the specific conductivity of said solution is at a predetermined value corresponding to the desired electrolyte concentration of said solution.

References Cited in the file of this patent

UNITED STATES PATENTS

| | | |
|---|---|---|
| 2,221,307 | Christie | Nov. 12, 1940 |
| 2,254,214 | Gage | Sept. 2, 1941 |
| 2,258,045 | Christie | Oct. 7, 1941 |
| 2,283,728 | Gage | May 19, 1942 |
| 2,475,023 | Grimes | July 5, 1949 |
| 2,528,889 | Kohl | Nov. 7, 1950 |